United States Patent

[11] 3,619,721

| [72] | Inventor | Willem F. Westendorp<br>Schenectady, N.Y. |
|---|---|---|
| [21] | Appl. No. | 42,327 |
| [22] | Filed | June 1, 1970 |
| [45] | Patented | Nov. 9, 1971 |
| [73] | Assignee | General Electric Company |

[54] TRIGGERED VACUUM GAP KEEP-ALIVE CIRCUIT
7 Claims, 5 Drawing Figs.

[52] U.S. Cl. ............................................. 317/12 A,
317/16, 317/31
[51] Int. Cl. ............................................. H02h 7/16
[50] Field of Search ............................................. 317/12 A,
12 B, 12 R, 16, 31; 315/227, 239, 207; 313/198;
336/178, 219

[56] References Cited
UNITED STATES PATENTS

| 2,363,898 | 11/1944 | Partington | 317/12 A |
| 2,792,556 | 5/1957 | Oglesbee | 336/178 X |
| 3,128,443 | 4/1964 | Herman | 336/178 X |
| 3,454,832 | 7/1969 | Hurtle | 317/16 X |
| 3,419,837 | 12/1968 | Marshall | 336/178 X |
| 3,230,459 | 1/1966 | Loya | 317/16 X |
| 2,900,578 | 8/1959 | Marbury | 317/12 A |

*Primary Examiner*—J. D. Miller
*Assistant Examiner*—Harvey Fendelman
*Attorneys*—John F. Ahern, Paul A. Frank, Julius J. Zaskalicky, Paul F. Wille, Frank L. Neuhauser, Oscar B. Waddell and Joseph B. Forman

ABSTRACT: This disclosure relates to a "keep-alive" circuit for a triggered vacuum gap wherein the duration of the usual trigger pulse is insufficiently long to maintain the vacuum gap in an active state for more than one half cycle at the power line frequency. A circuit utilizing current transformers is described wherein a current transformer provides the trigger pulse necessary to maintain the vacuum gap in an active state for as long as necessary to protect electrical equipment shunted by the vacuum gap.

Inventor:
Willem F. Westendorp,
by Paul F. Wille
His Attorney.

TRIGGERED VACUUM GAP KEEP-ALIVE CIRCUIT

This invention relates to triggered vacuum gaps; specifically, to "keep-alive" circuits for maintaining the vacuum gap in an active state, i.e., a state in which an electric discharge across the gap is readily obtainable.

In power distribution systems, the great length of the power lines suspended above the earth acts as an inductance in series with the power lines. It is the practice to compensate for this series inductance by coupling a series capacitance into the power line. This series capacitance takes the form of large banks of capacitors spaced more or less regularly along the power line; for example, every one hundred miles. The power lines also have an associated capacitance between the power line and ground. This is compensated for by a shunt inductor usually located with the capacitor banks.

A problem faced by the capacitor banks, and not by the shunt inductor, is that the capacitor banks are in a series circuit with the power line and therefore must be able to withstand the current carried by the power line. A problem develops however when an overload or short circuit of the power line occurs. When this happens, the current through the capacitor bank may go to five or more times the rating of the bank. If these conditions are not enough to destroy the capacitor bank, they weaken the dielectric sufficiently that another fault on the line would destroy the capacitor.

Two basic approaches may be taken to alleviate this problem. One is to utilize capacitors of sufficiently high current capacity to withstand faults on the power line. The cost of this approach tends to be rather high relative to be benefits received.

The second approach is to utilize capacitor banks of sufficient current rating to withstand brief overloads until ancillary equipment can either shunt the capacitor bank and carry the current or take the capacitor bank out of the circuit. This second approach generally envisions a spark gap or triggered vacuum gap connected in parallel (shunt) with the capacitor bank so that, when an overload current induces a higher than normal voltage across the bank, an arc is initiated between the electrodes of the spark gap or the triggered vacuum gap. This arc then safely carries the current which would otherwise pass through the capacitor bank.

The use of spark gaps in conjunction with capacitor banks is not new and is not a panacea. There are difficulties in the use of spark gaps or triggered vacuum gaps and it is to these difficulties that the present invention is addressed. When a fault induces a heavy overload current, the voltage across the capacitor rises until the breakdown voltage of the gap is reached. An arc is struck across the gap and the gap carries both the overload current and the discharge current of the capacitor bank. This, however, lasts for only one half of a cycle. At the end of one half cycle, the arc ceases and the capacitor bank must then be charged sufficiently to retrigger an arc. Thus, the capacitor bank is again exposed to the full overload current for the next half cycle. This procedure continues until a mechanical switch has had a chance to be activated in order to bypass the capacitor bank and spark gap.

Rather than relying on the capacitor bank to "self-trigger" the triggered vacuum gap, auxiliary triggering means have been provided in which overcurrent sensors produce the requisite trigger pulse upon the existence of an overcurrent in the power line. The use of conventional current transformers, wherein an increased current induces a sufficiently high secondary voltage to trigger a triggered vacuum or "triggered discharge" gap, sometimes leads to difficulty in properly timing the trigger signal to fire the triggered vacuum gap. Further, it has been found that the current transformers used to trigger a triggered vacuum gap may cause high wear thereof by virtue of the fact that current is continuously flowing through the trigger electrode.

In view of the foregoing, it is therefore an object of the present invention to provide an improved protective circuit wherein overload currents bypass the protected device.

It is a further object of the present invention to provide an improved triggering circuit for triggered vacuum gaps.

It is another object of the present invention to improve the timing of trigger signals to the protective circuit.

It is a further object of the present invention to provide an improved overcurrent protective circuit wherein the saturation effects of current transformers, used to sense overcurrent, are reduced.

It is another object of the present invention to provide an improved overcurrent protective circuit utilizing a triggered vacuum gap wherein wear on the trigger electrode of the triggered vacuum gap is reduced.

The foregoing objects and advantages are achieved by the present invention wherein there is provided a triggered vacuum gap shunting the capacitor bank to be protected, a pair of current transformers connected one to each side of said capacitor bank and having their primaries in series therewith. Connecting the secondaries of the current transformers is a second, preset spark gap which is also connected to the trigger electrodes of the triggered vacuum gap. Upon an overload current, the voltage of the capacitor bank increases thereby triggering the preset spark gap. Current through the preset spark gap also flows through the trigger electrodes, triggering the triggered vacuum gap into an active state so that the triggered vacuum gap carries the current which would otherwise flow through the capacitor bank. The saturation effects of the current transformers is reduced by providing an air gap in the core of the transformers, thereby assuring proper timing of the trigger signals. Thyrite resistances are connected in series with the trigger electrodes of the triggered vacuum gap to reduce the trigger current during normal current flow through the power line, thus reducing trigger wear.

The various features of the invention may best be understood by considering the following detailed description in conjunction with the attached drawings, in which.

Figure 1:
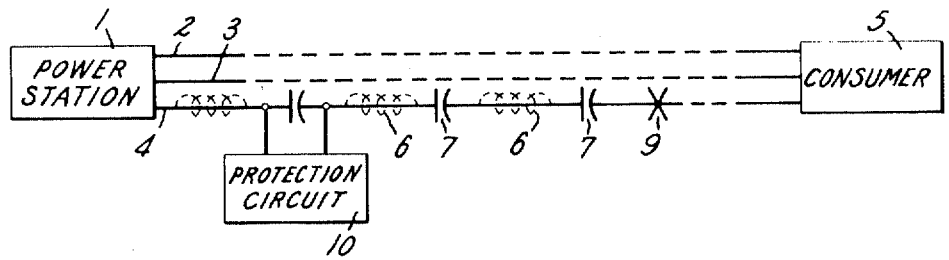
FIG. 1 illustrates the general use to which the present invention may be put.

Referring to FIGURE 1 there is shown a portion of a typical power distribution system. Power generated in power station 1 is conveyed to the consumer at location 5 by way of power lines 2, 3, and 4. Illustrated along line 4 is the inductance 6 due to the length of the power line above the surface of the earth. In order to compensate for inductance 6 there is inserted along the length of the transmission line a series of capacitors 7 spaced at more or less regular intervals. These capacitors are in series with the power line and in effect form a series resonant circuit with the inductance of the power line. The impedance of the capacitors is made to be approximately 70 percent of the impedance of the line.

If a fault occurs, such as a short circuit at location 9, an overload current is drawn which must pass through the series capacitors 7. In the event of a fault, protection circuits associated with each of the series capacitors, such as protection circuit 10, interrupt the flow of current through the series capacitor by short circuiting it. Protection circuits such as protection circuit 10 may also include switching apparatus for switching the current to an alternate transmission line in an attempt to bypass the fault. The present invention is directed to protection circuits that serve to carry the current for the series capacitor thereby preventing damage of the series capacitor by a high overload current.

Figure 2:
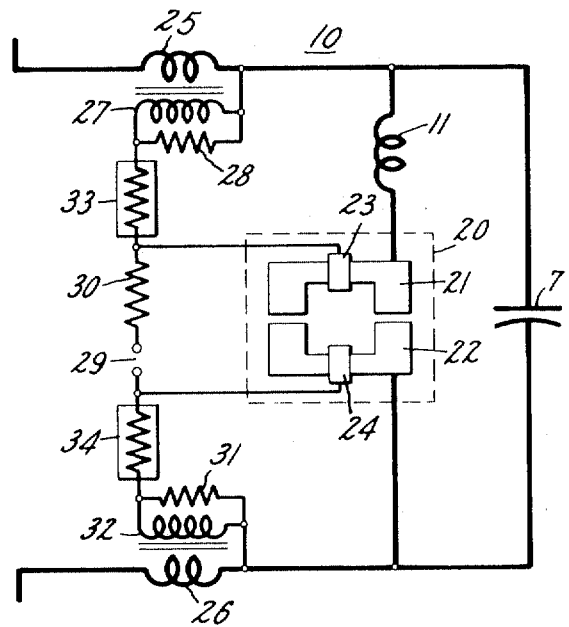
FIG. 2 illustrates a preferred embodiment of the present invention.

Referring to FIGURE 2 in which there is shown a circuit diagram of a preferred embodiment of the present invention. As shown in FIGURE 2, series capacitor 7, which represents the capacitor banks stationed at regular intervals along a power line, has connected across its terminals a triggered vacuum gap comprising envelope 20, first and second main electrodes 21 and 22, and trigger electrodes 23 and 24. Connected in series between series capacitor 7 and the triggered vacuum gap is a series inductance 11 which serves to limit the surge current when the triggered vacuum gap is activated. The value for the inductance represented by inductor 11 is chosen relative to the value of capacitor 7 so that the number of microhenries equals the number of microfarads. The elements of protection circuit 10 which serve to activate the triggered vacuum gap includes first and second current transformers comprising primaries 25 and 26 connected in series with the series capacitor 7, and secondaries 27 and 32, respectively. The first current transformer has a load resistance 28 connected across secondary 27 which serves to limit the secondary voltage of the current transformer. Also connected across secondary 27 is a series circuit comprising Thyrite element 33, trigger 23, and main electrode 21. The second current transformer similarly has load resistance 31 connected across secondary 32 and a series circuit comprising Thyrite element 34, trigger 24, and main electrode 22. Further, one side of each of secondaries 27 and 32 is connected to a pilot gap means comprising spark gap 29 and current limiting resistor 30.

The overall operation of the circuitry of FIGURE 2 is as follows: An overload current flowing through series capacitor 7 will induce a higher than normal voltage across capacitor 7. This higher than normal voltage will initiate a discharge across pilot gap 29. Current then flows from the power line through inductance 11 to electrode 21, through trigger 23, resistor 30, pilot gap 29, trigger element 24 to electrode 22 and the other side of capacitor 7. Current flowing between triggers and main electrodes causes a discharge between the trigger electrode and its associated main electrode of series capacitor 7 through main electrode 21, trigger electrode 23, the pilot gap means, trigger electrode 24, and main electrode 22 to the other side of series capacitor 7. This causes some of the trigger plasma or ionized vapor to diffuse into the space between main electrodes 21 and 22. The trigger electrode plasma decreases the dielectric strength of the gap and causes an electric discharge to take place across main electrodes 21 and 22. Thus, initially, a portion of the overload current is borne by the pilot gap and then the full overload current is carried by main electrodes 21 and 22. After the initial breakdown of pilot gap and triggered vacuum gap by high voltage across capacitor 7, the excessive secondary currents in the current transformer maintain the vacuum arc by keep-alive action of the triggers.

Considering one-half of the circuit, Thyrite element 33 discriminates between the relatively high overload current and the current due to the voltage induced in secondary 27 so as to limit the induced current to a relatively safe value sufficient to cause the evaporation of some electrode material from the electrode 23 but yet to limit the trigger current to a value that will insure a long life for the trigger element.

Figure 3:
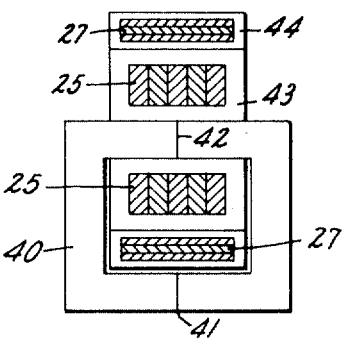
FIG. 3 illustrates a current transformer constructed in accordance with the present invention.

Another aspect of the present invention is illustrated in FIGURE 3 which shows in detail the construction of a current transformer as used in the present invention. As shown in FIGURE 3, the current transformer comprises a primary winding 25 concentrically wrapped with a secondary winding 27 about a core 40 and contained within insulating members 43 and 44, respectively. The core of the current transformer is a split core containing a gap or gaps such as 41 and 42. This core differs from the general construction of transformer cores in that there is no region of overlap in the laminations of the core but the halves of the core are separated by a gap which may contain air or other suitable nonmagnetic dielectric. In practice, a suitable size for the gaps has been found to be 0.018 inch. While shown as a double split, that is, containing two gaps 41 and 42, the transformer core may contain just a single gap, with the attendant difficulties in winding the transformer.

Figure 4:
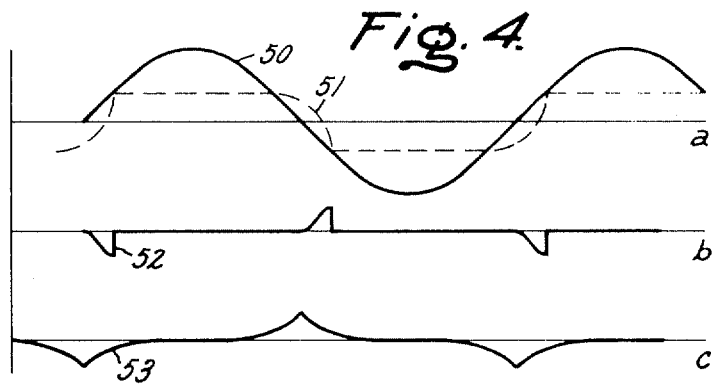
FIG. 4 illustrates waveforms showing the operation of the present invention.
Figure 5:
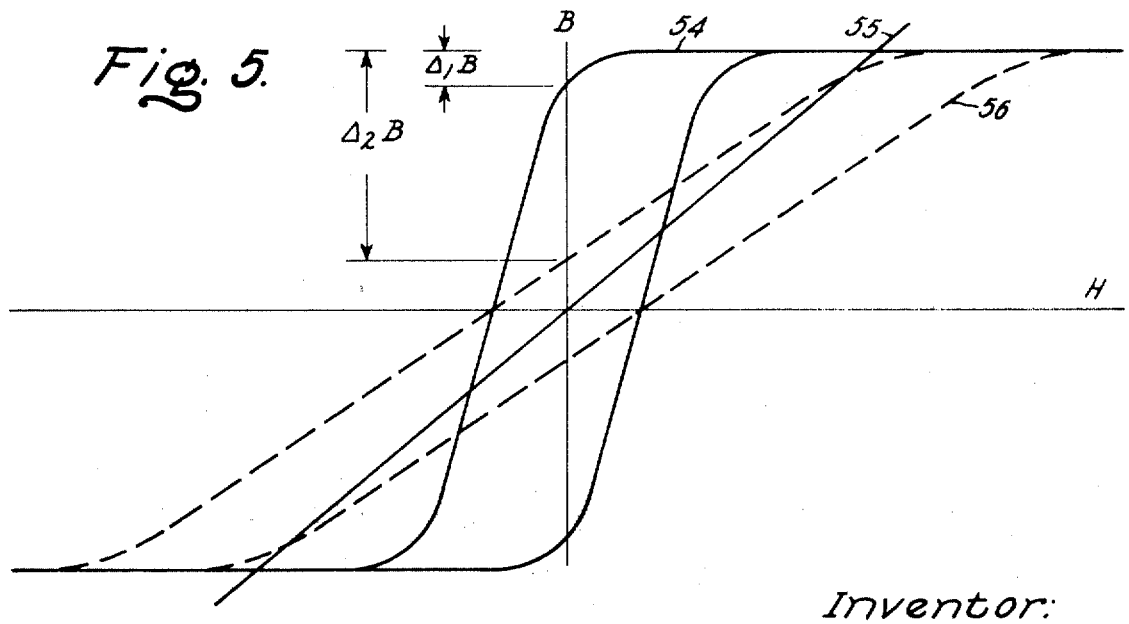
FIG. 5 illustrates a hysteresis curve of a current transformer in accordance with the present invention.

The operation of the current transformer as illustrated in FIGURE 3 may best be described and understood by a consideration of FIGURES 4 and 5. In FIGURE 4 curve A represents a curve of the primary current 50 and the B field induced by the primary current 51. Curve B illustrates the induced secondary current which as can be seen flows largely after the zero crossing of the primary current. The net result of this is that generally, only the first half of the overload current would flow through the triggered vacuum gap. This unsatisfactory behavior may be explained by means of FIGURE 5 in which curve 54 represents a conventional hysteresis curve, as would be obtained from a transformer having a conventional core, after an excessive primary current has saturated the core. The reduction of this current to zero produces a miner change $\Delta_1 B$ in the induction of the core and this is insufficient to produce a high enough voltage to force adequate trigger current through the Thyrite and trigger. If however a gap is maintained in the core of the transformer, this problem can be alleviated due to the B-H characteristics of the gaps, illustrated in FIGURE 5 by straight line 55. Since practically the same flux passes through the core as across the gap, the H values may be added for the same B values, resulting in curve 56 which then represents the B-H characteristic of the core with the gaps. With this arrangement, after a saturating current has flowed through the primary, a reduction of the primary current to zero produces a change in induction $\Delta_2 B$ which is much larger than $\Delta_1 B$. The waveforms C of FIGURE 4 represents the secondary current from a current transformer containing a core with gaps. This can be seen from FIGURE 4 where the triggering of current flows well before and after the zero crossing of the primary current, resulting in a sufficient trigger voltage so that the triggered vacuum gap is activated for every half cycle of overload.

Thus, current transformers having cores with gaps provide a more accurate triggering of the triggered vacuum gap and discriminating use of Thyrite provides a means of discriminating between the normal low level of secondary current from the transformers and the higher level resulting in an overload so that the wear on the triggers due to the current flowing through them is substantially reduced.

While one embodiment of the present invention has been shown and described, it will be obvious to those skilled in the art that many modifications may be made without departing from the spirit and scope of the present invention. For example, while the present invention has been illustrated with respect to a triggering circuit comprising two current transformers and a triggered vacuum gap comprising two trigger elements, it is readily modified so that only one current transformer and trigger electrode need be used. Further, the preferred embodiment may also be modified so that the triggering circuit operates with triggered vacuum gaps having a central electrode.

What I claim as new and desire to secure by Letters Patent of the United States is:

1. An overcurrent protection circuit for shunting a device to be protected comprising:
   triggered vacuum gap means having first and second main electrodes and at least one trigger electrode, said triggered vacuum gap means connected in shunt with said device;
   current transformer means having primary and secondary windings on a core having at least one nonmagnetic gap therein, said primary winding being series connected with said device and said triggered vacuum gap means to sense the current therethrough; and
   current discriminating means for coupling said secondary winding to said trigger electrode.

2. An overcurrent protection circuit as set forth in claim 1 wherein said current discriminating means comprises a Thyrite resistance coupled to a secondary winding of said current transformer means.

3. An overcurrent protection device as set forth in claim 1 wherein
   said current discriminating means comprises a nonlinear resistance element coupling said secondary winding to said trigger electrode.

4. An overcurrent protection device as set forth in claim 3 wherein said nonlinear resistance comprises a Thyrite disk.

5. An overcurrent protection device as set forth in claim 1 wherein said core means comprises two C-shaped halves with open sides facing each other, thereby forming a pair of nonmagnetic gaps.

6. An overcurrent protection device as set forth in claim 5 wherein said current transformer means comprises a pair of current transformers, said triggered vacuum gap includes first and second trigger electrodes and wherein said first and second trigger electrodes are coupled one each to the secondaries of said current transformers by a nonlinear resistance.

7. An overcurrent protection device as set forth in claim 1 wherein said current transformer means comprises a pair of current transformers, said triggered vacuum gap includes first and second trigger electrodes, and wherein said first and second trigger electrodes are coupled one each to the secondaries of said current transformers by nonlinear resistances.

* * * * *